Patented Aug. 27, 1946

2,406,369

UNITED STATES PATENT OFFICE 2,406,369

PREPARATION OF ORGANIC SOLVENT-SOLUBLE UNSATURATED CARBOHYDRATE ETHERS AND PRODUCTS PRODUCED THEREBY

Robert M. Hamilton and Peter L. Nichols, Jr., Philadelphia, Pa., assignors to United States of America, as represented by the Secretary of Agriculture No Drawing. Application January 20, 1944, Serial No. 518,976

8 Claims. (Cl. 260—231)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the preparation of unsaturated ethers of carbohydrates, and more particularly to the preparation of allyl ethers of carbohydrates which are soluble in organic solvents, and to the products resulting therefrom.

When allyl starch or allyl cellulose are prepared by the known methods of etherification, a product results which is insoluble in organic solvents, presumably due to polymerization of the allyl groups at elevated temperatures or the addition of oxygen. In this insoluble and infusible form, such products are not suitable for molding and they cannot be uniformly applied to surfaces. Soluble allyl carbohydrates, such as allyl starch or cellulose, on the other hand, are well suited for the formulation of lacquers and plastic materials. Among the objects of the present invention, therefore, is the provision of a new process yielding allyl ethers of starch or cellulose which are soluble in organic solvents.

Other objects will appear from the following description. According to this invention, an acylated carbohydrate of any desirable degree of substitution is dissolved in acetone or other suitable solvent. It is then heated at atmospheric pressure, or in an autoclave, in the presence of aqueous caustic alkali of suitable concentration and an unsaturated etherifying agent, such as allyl, crotyl, and cinnamyl halides. In this manner the starch acetate is simultaneously deacetylated and etherified, and an organic solvent-soluble product is obtained.

The following examples illustrate the process:

Example I 75 parts of potato starch acetate (44.8% acetyl or less) was dissolved in 200 parts of acetone and 200 parts of 50 percent aqueous caustic alkali and 250 parts of allyl chloride were added. The mixture was placed in an autoclave fitted with a stirrer and heated to 85° C. for 10 hours. The mixture was then steam distilled and the product further purified by dissolving in acetone and precipitating with water. 100 parts of allyl bromide was recovered by the steam distillation. The white gummy, semi-elastic product was soluble in the usual organic solvents such as acetone, ethylene chlorohydrin, benzene, alcohol, and so forth. Analysis showed that this substance contained 2.0 allyl groups per glucose unit.

Example II 75 parts of potato starch acetate (44.8% acetyl or less) was dissolved in 200 ml. of acetone and heated with constant stirring under reflux at 55° C. while 200 parts of 50 per cent aqueous caustic alkali and 400 parts of allyl bromide were slowly and simultaneously introduced in the reaction vessel. The reaction mixture was kept for four hours at reflux temperature. It was then steam distilled to remove the volatile organic material. 107 parts of allyl bromide was recovered by the steam distillation. The resulting gummy material was washed with water until no longer alkaline and further purified as described in Example I. This gummy material dissolved in the usual organic solvents such as acetone, ethylene chlorohydrin, benzene, alcohol, and so forth, and by analysis showed 1.5 allyl groups per glucose unit.

Example III

Using the procedure in Example I with potato starch acetate and allowing the reaction to proceed for 8 hours at 80° C., a white, powdery allyl starch, insoluble in water, but completely soluble in ethylene chloride, and almost completely soluble in acetone was obtained. Analysis showed 1.3 allyl groups per glucose unit.

Example IV 50 parts of corn starch acetate (44.8% or less) was dissolved in 250 parts of acetone. To this solution 400 parts of allyl bromide was added. After five minutes 100 parts of sodium hydroxide dissolved in 100 parts of water was added. The reaction mixture was heated at reflux temperature for one hour while stirring. The product was purified by steam distillation and 110 parts of allyl bromide was recovered. When the resulting product was washed thoroughly with water, collected, and dried, a light yellow powder completely soluble in acetone and ethylene chlorohydrin resulted. Analysis showed 1.4 allyl groups per glucose unit.

Example V

Using the procedure in Example IV with corn starch acetate, and heating for 3 hours, a light yellow, gummy, semi-elastic product was obtained. This product was completely soluble in acetone and ethylene chlorohydrin, ether, ethanol, and benzene. Analysis indicated 1.6 allyl groups per glucose unit.

Example VI

Using the procedure in Example IV with acetone soluble cellulose acetate, and heating for 3 hours, a white, powdery product soluble in ethylene chlorohydrin and insoluble in water was obtained. Analysis showed 1.6 allyl groups per glucose unit.

Example VII

Using the procedure in Example IV with tapioca starch acetate, and heating for 4 hours, a light yellow, gummy, semi-elastic product was obtained. Analysis showed 1.8 allyl groups per glucose unit.

Example VIII

A variation of the procedure described in Example II in which the acetone solution of potato starch acetate and the caustic alkali solution were slowly and simultaneously added to the allyl bromide gave a similar gummy product with 2.4 allyl groups per glucose unit. Likewise, slow addition of the caustic alkali solution to a mixture of allyl bromide and the acetone solution of potato starch acetate gave a gummy product with 2.1 allyl groups per glucose unit.

Having thus described our invention, we claim:

1. The process of preparing unsaturated carbohydrate ethers which comprises forming a solution of a substantially completely acylated carbohydrate selected from the group consisting of starch and cellulose, and then heating the solution in the presence of aqueous caustic alkali and an unsaturated etherifying agent.

2. The process of preparing unsaturated starch ethers which comprises forming a solution of substantially completely acylated starch, and then heating the solution in the presence of aqueous caustic alkali and an unsaturated etherifying agent.

3. The process of preparing allyl starch which comprises forming a solution of substantially completely acylated starch in acetone, and then heating the solution in the presence of aqueous caustic alkali and an allyl halide.

4. The process of preparing unsaturated cellulose ethers which comprises forming a solution of substantially completely acylated cellulose, and then heating the solution in the presence of aqueous caustic alkali and an unsaturated etherifying agent.

5. The process of preparing allyl cellulose which comprises forming a solution of substantially completely acylated cellulose in acetone, and then heating the solution in the presence of aqueous caustic alkali and an allyl halide.

6. Compositions of matter comprising organic solvent-soluble allyl ethers of carbohydrates selected from the group consisting of ethers of starch and ethers of cellulose containing at least 1.3 allyl groups per glucose unit for allyl starch and 1.6 allyl groups per glucose unit for allyl cellulose.

7. A composition of matter comprising organic solvent-soluble allyl starch containing at least 1.3 allyl groups per glucose unit.

8. A composition of matter comprising organic solvent-soluble allyl cellulose containing at least 1.6 allyl groups per glucose unit.

ROBERT M. HAMILTON.
PETER L. NICHOLS, JR.